United States Patent
Lambert et al.

(10) Patent No.: US 7,623,355 B2
(45) Date of Patent: Nov. 24, 2009

(54) EXTENDED UNIVERSAL SERIAL BUS CONNECTIVITY

(75) Inventors: Grady D. Lambert, Groton, MA (US); Ryan C. McDaniel, Hudson, MA (US)

(73) Assignee: SMART Modular Technologies, Inc., Fremont, CA (US)

( * ) Notice: Subject to any disclaimer, the term of this patent is extended or adjusted under 35 U.S.C. 154(b) by 433 days.

(21) Appl. No.: 11/075,407

(22) Filed: Mar. 7, 2005

(65) Prior Publication Data

US 2006/0198113 A1 Sep. 7, 2006

(51) Int. Cl.
*H05K 7/00* (2006.01)

(52) U.S. Cl. .................................... 361/777
(58) Field of Classification Search ............... 361/777, 361/778; 439/79, 610, 680
See application file for complete search history.

(56) References Cited

U.S. PATENT DOCUMENTS

| | | | |
|---|---|---|---|
| 5,346,117 A * | 9/1994 | Kohn et al. | 228/180.22 |
| 5,975,958 A * | 11/1999 | Weidler | 439/620.22 |
| 6,148,354 A | 11/2000 | Ban et al. | |
| 6,854,984 B1 * | 2/2005 | Lee et al. | 439/79 |
| 2004/0130347 A1 * | 7/2004 | Moll et al. | 326/62 |
| 2004/0223366 A1 * | 11/2004 | Miura et al. | 365/154 |
| 2005/0166015 A1 * | 7/2005 | Bruner et al. | 711/112 |

OTHER PUBLICATIONS

USB Standards Group, "Universal Serial Bus Specification, Revision 1.1", (Sep. 23, 1998).
USB Standards Group, USB Engineering Change Notice "USB Parameters", USB Specification Rev. 1.1, (Oct. 7, 1999).
USB Standards Group, "USB 2.0 Specification Engineering Change Notice (ECN) #1: Mini-B Connector", (Oct. 20, 2000).
USB Standards Group, "Universal Serial Bus Specification, Revision 2.0", (Apr. 27, 2000).
USB Standards Group, Errata for "USB Revision 2.0 Apr. 27, 2000", as of (Dec. 7, 2000).
USB Standards Group, "On-the-Go Supplement to the USB 2.0 Specification Revision 1.0", (Dec. 18, 2001).
USB Standards Group, Errata for "USB Revision 2.0 Apr. 27, 2000" as of (May 28, 2002).
USB Standards Group, "On-the-Go Supplement to the USB 2.0 Specification, Revision 1.0a", (Jun. 24, 2003).
USB Standards Group, Erratta for "On-the-Go Supplement to the USB 2.0 Specification, Revision 1.0a", (Jan. 27, 2004).
M Systems, "UDiskOnChip (uDOC) Modular Flash Disk with USB 2.0 Interface", (Nov. 2004).
USB Standards Group, USB Engineering Change Notice, "Pull-up/Pull-down resistors" applies to Universal Serial Bus Specification Revision 2.0.

(Continued)

*Primary Examiner*—Jeremy C Norris
*Assistant Examiner*—Abiy Getachew
(74) *Attorney, Agent, or Firm*—Perkins Coie LLP

(57) ABSTRACT

A system, method and apparatus is provided for extended universal serial bus connectivity. In one embodiment, the invention is an apparatus. The apparatus includes a printed circuit board having a plurality or traces. The plurality of traces includes a first set of traces defining a universal serial bus. The first set of traces is routed between a connector site and an interface circuitry site. The plurality of traces also includes a second set of traces. The second set of traces defines extended signals of the universal serial bus. The second set of traces is routed between the connector site and the interface circuitry site.

14 Claims, 7 Drawing Sheets

OTHER PUBLICATIONS

USB Standards Group, USB Engineering Change Notice, "Interface Association Descriptor" applies to Universal Serial Bus Specification Revision 2.0.

USB Standards Group, Engineering Change Notice, "Rounded Chamfer" applies to Universal Serial Bus Specification Revision 2.0.

* cited by examiner

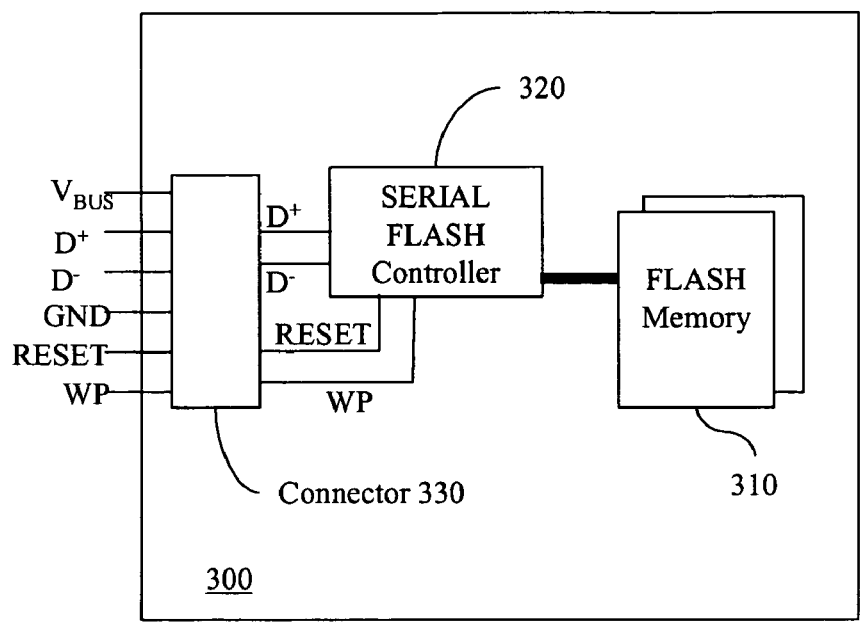
Fig. 3
Fig. 4
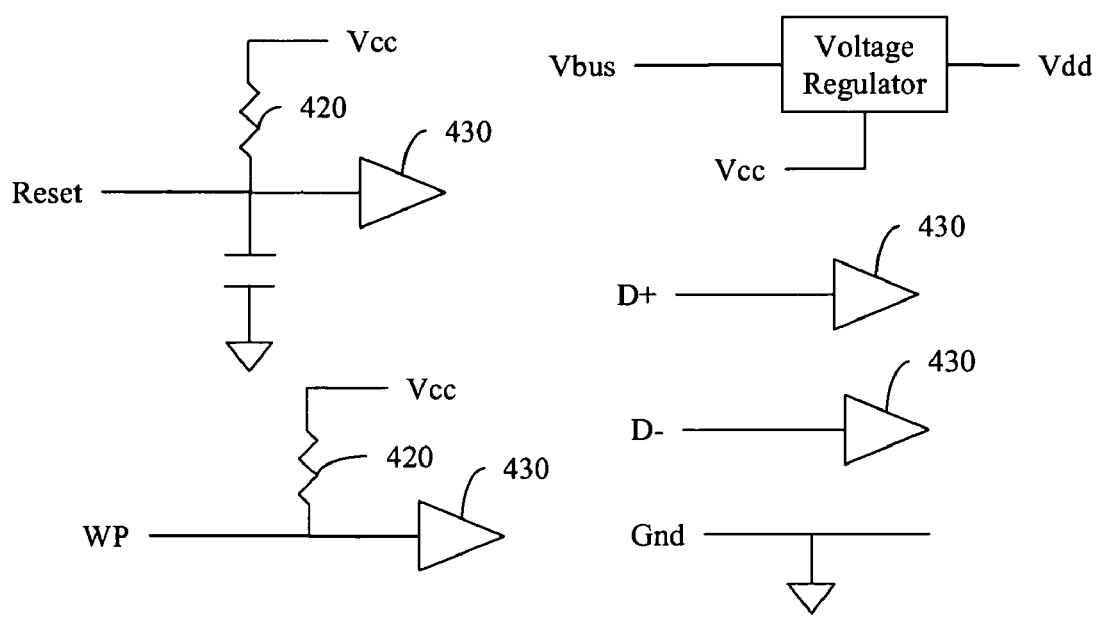

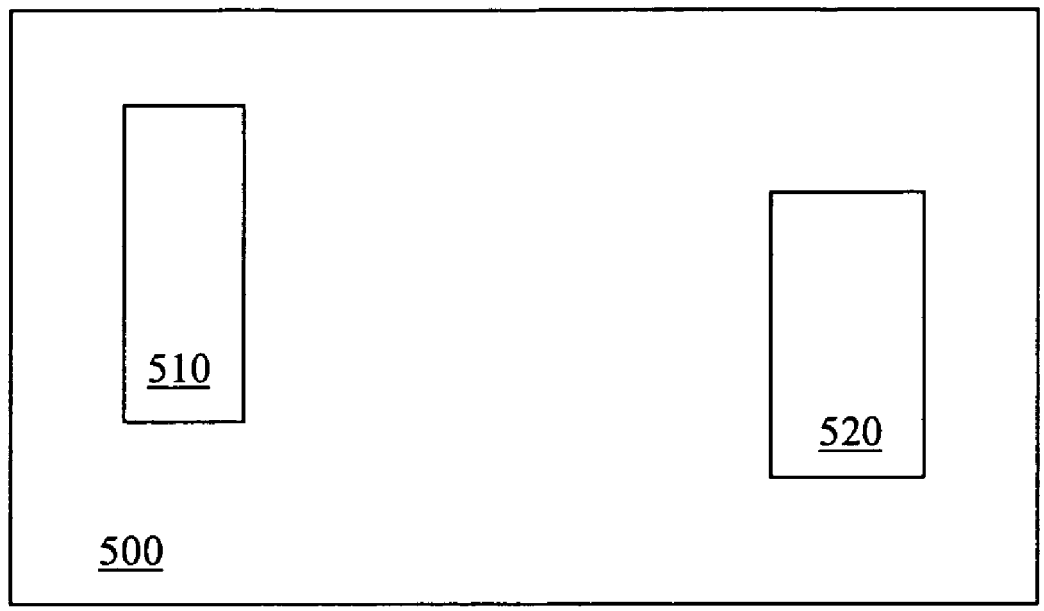
Fig. 5A
Fig. 5B
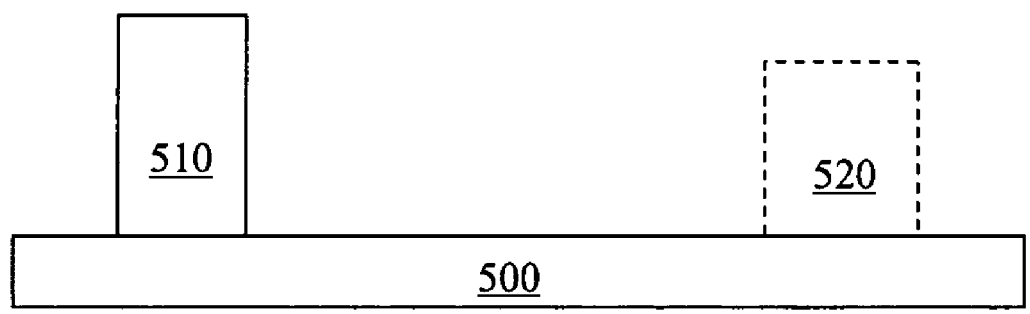

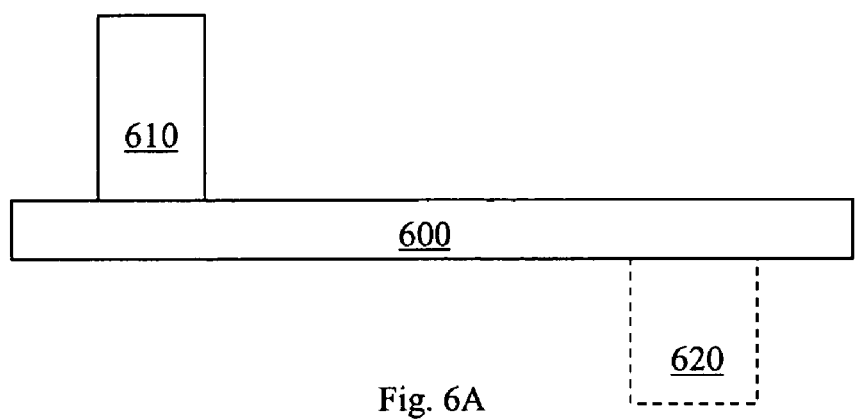
Fig. 6A
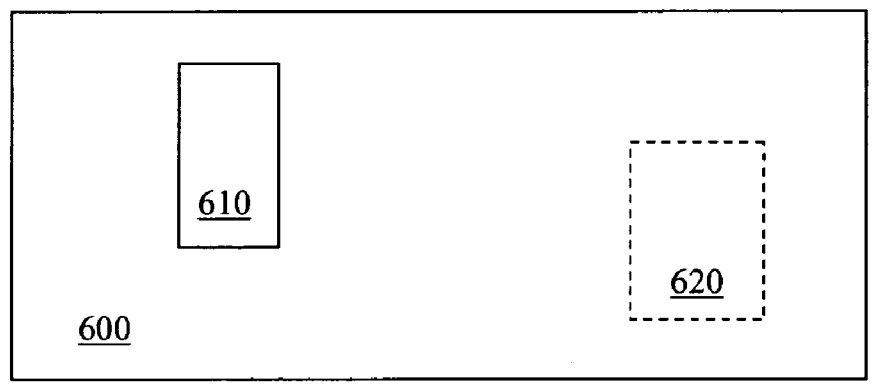
Fig. 6B
Fig. 6C
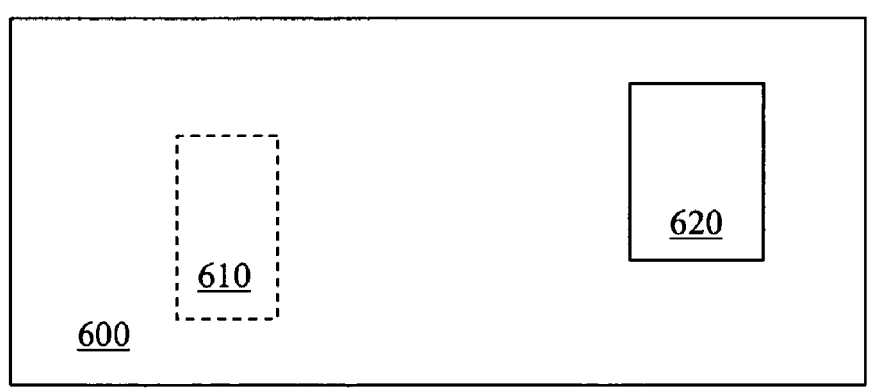

EXTENDED UNIVERSAL SERIAL BUS CONNECTIVITY

CROSS-REFERENCE TO RELATED APPLICATION

Application Ser. No. 11/075,405, entitled "CONFIGURED PRINTED CIRCUIT BOARDS", and filed on the same date as this application is hereby incorporated herein by reference as if fully set forth herein. Application Ser. No. 11/075,406, entitled "STACKABLE PRINTED CIRCUIT BOARDS", and filed on the same date as this application is also hereby incorporated herein by reference as if fully set forth herein.

TECHNICAL FIELD

The inventions generally relates to printed circuit boards and more specifically relates to FLASH memory modules and USB interfaces.

BACKGROUND

Computer systems are being embedded in more applications or devices. This enables devices with greater capabilities and adaptable features, which may be changed by programming embedded computer or processor systems. In order to embed a processor, memory for the processor must also be supplied. Such memory is typically FLASH memory. FLASH memory provides reliability and maintains data without requiring power, thus allowing for rugged operation. At the same time, FLASH memory may be programmed, allowing for changes and maintenance of code or data stored therein.

Communication between memory and a processor typically occurs over a bus. Memory typically is designed to provide data along a large number of signal lines. A processor is often designed to communicate data along a universal serial bus. Unfortunately, the universal serial bus provides for only two data lines. Thus, a memory module including FLASH memory must be controlled using those two data lines. This means that any control signal must be encoded along those two data lines. If a design implemented one of the data lines as a reset signal, for example, then only one data line would be available for actual data transmission. Similarly, if a design implemented one of the data lines as a reset signal, then only one data line would be available for actual data transmission. Thus, it may be useful to provide a universal serial bus that can accommodate control and data signals.

SUMMARY

A system, method and apparatus is provided for extended universal serial bus connectivity. In one embodiment, the invention is an apparatus. The apparatus includes a printed circuit board having a plurality or traces. The plurality of traces includes a first set of traces defining a universal serial bus. The first set of traces are routed between a first connector site and an interface circuitry site. The first set of traces are also routed between a second connector site and the interface circuitry site. The plurality of traces also includes a second set of traces. The second set of traces defines extended signals of the universal serial bus. The second set of traces is routed between the second connector site and the interface circuitry site.

In another embodiment, the invention is a method of fabricating a memory module. The method includes fabricating a printed circuit board. The method further includes determining whether a standard or extended universal serial bus is required. The method also includes populating an appropriate connector based on which bus is required. The method further includes populating the printed circuit board with memory components.

In yet another embodiment, the invention is an apparatus. The apparatus includes a printed circuit board having a plurality or traces. The plurality of traces includes a first set of traces defining a universal serial bus. The first set of traces is routed between a connector site and an interface circuitry site. The plurality of traces also includes a second set of traces. The second set of traces defines extended signals of the universal serial bus. The second set of traces is routed between the connector site and the interface circuitry site.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

FIG. 3 illustrates an embodiment of a FLASH memory module.

FIG. 4 illustrates an embodiment of an inbound signal interface.

FIG. 5A illustrates a top view of an embodiment of a printed circuit board.

FIG. 5B illustrates a side view of the printed circuit board of FIG. 5A in a first configuration.

FIG. 6A illustrates a side view of an alternative embodiment of a printed circuit board.

FIG. 6B illustrates a top view of the printed circuit board of FIG. 6A in a first configuration.

FIG. 6C illustrates a bottom view of the printed circuit board of FIG. 6A in a second configuration.

DETAILED DESCRIPTION

Figure 1:
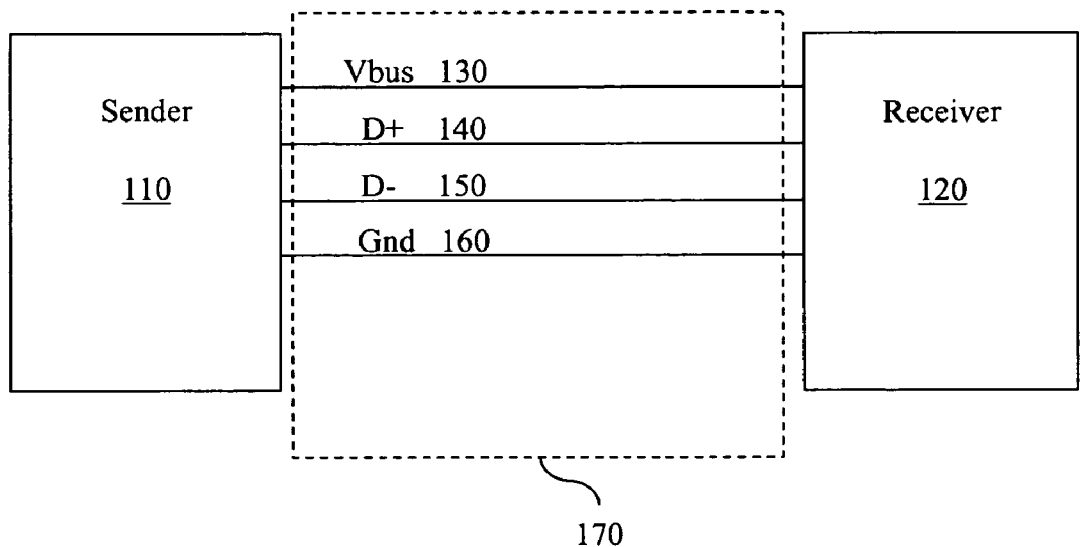
FIG. 1 illustrates an embodiment of a system incorporating a USB bus.

A system, method and apparatus is provided for extended universal serial bus connectivity. The specific embodiments described in this document represent exemplary instances of the present invention, and are illustrative in nature rather than restrictive in terms of the scope of the present invention. The scope of the invention is defined by the claims.

Various embodiments may be used to provide an extended or enhanced USB bus. In some embodiments, two specific signal lines are added to the bus, thereby maintaining a simple bus (with four signal lines rather than two, but still a small number) while adding useful control lines. Thus, a reset and a write protect control line may be added, for example. Moreover, the extended or enhanced USB bus may be used in conjunction with a memory module in a variety of applications, allowing for embedded memory with a well-defined interface. In such applications, various connectors may be populated based on whether a standard or enhanced bus is used in the overall design.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is an apparatus. The apparatus includes a printed circuit board having a plurality or traces. The plurality of traces includes a first set of traces defining a universal serial bus. The first set of traces are routed between a first connector site and an interface circuitry site. The first set of traces are also routed between a second connector site and the interface circuitry site. The plurality of traces also includes a second set of traces. The second set of traces defines extended signals of the universal serial bus. The second set of traces is routed between the second connector site and the interface circuitry site.

In some embodiments, a connector is connected to the first connector site, and the connector includes conductors coupled to the first set of traces. Similarly, in some embodiments a connector is connected to the second connector site, and the connector includes conductors coupled to the first set of traces and the second set of traces. Furthermore, the second set of traces may define a reset signal and a write protect signal. In some embodiments, a means for connecting the first connector site to a separate printed circuit board is provided.

The apparatus may include a FLASH memory chip coupled to the printed circuit board. The memory chip is coupled to the interface circuitry site through traces of the printed circuit board. The apparatus may also include a FLASH memory controller chip coupled to the printed circuit board at the interface circuitry site. The controller chip incorporates interface circuitry. The apparatus may also include a connector connected to the first connector site. The connector includes conductors coupled to the first set of traces and thereby to the controller chip. Alternatively, the apparatus may include a connector connected to the second connector site. The connector includes conductors coupled to the first set of traces and the second set of traces and thereby coupled to the controller chip. The apparatus may further include interface circuitry coupled to the printed circuit board at the interface circuitry site. The interface circuitry is coupled to the controller chip and to the first connector site and the second connector site.

In another embodiment, the invention is a method of fabricating a memory module. The method includes fabricating a printed circuit board. The method further includes determining whether a standard or extended universal serial bus is required. The method also includes populating an appropriate connector based on which bus is required. The method further includes populating the printed circuit board with memory components.

In yet another embodiment, the invention is an apparatus. The apparatus includes a printed circuit board having a plurality or traces. The plurality of traces includes a first set of traces defining a universal serial bus. The first set of traces is routed between a connector site and an interface circuitry site. The plurality of traces also includes a second set of traces. The second set of traces defines extended signals of the universal serial bus. The second set of traces is routed between the connector site and the interface circuitry site.

The apparatus may further include a FLASH memory chip coupled to the printed circuit board. The memory chip is coupled to the interface circuitry site through traces of the printed circuit board. The apparatus may also include a FLASH memory controller chip coupled to the printed circuit board at the interface circuitry site. The controller chip incorporates interface circuitry. Furthermore, the apparatus may include a connector connected to the connector site. The connector includes conductors coupled to the first set of traces and the second set of traces.

Additionally, the second set of traces may define a reset signal and a write protect signal. Similarly, the first set of traces may define a power trace, a ground trace, a first data signal and a second data signal. Moreover, the apparatus may include a plurality of FLASH memory chips coupled to the printed circuit board. The plurality of memory chips is coupled to the interface circuitry site through traces of the printed circuit board. The apparatus may also include a FLASH memory controller chip coupled to the printed circuit board electrically between the connector site and the plurality of FLASH memory chips.

Understanding of the system may be enhanced by a description of the USB (universal serial bus) bus. As mentioned previously, the USB bus typically has only two data lines. FIG. 1 illustrates an embodiment of a system incorporating a USB bus. System 100 includes a USB bus, a sender and a receiver component. System 100 illustrates a USB bus as it may operate when one component transmits information to another component.

Sender 110 is a bus component which sends data on the bus. Coupled or connected to sender 110 are Vbus line 130, D+ line 140, D− line 150 and Ground line 160. Collectively, lines 130, 140, 150 and 160 make up bus 170, which is a USB bus. Also coupled or connected to lines 130, 140, 150 and 160 is receiver component 120, a component which receives data from the bus. Thus, bus 170 links sender 110 to receiver 120, allowing for serial communication along bus 170. As the USB specification allows for multiple devices on a bus, bus 170 may be routed to other components.

Similarly, system 100 should be understood as depicting a snapshot of a bus system, where a first component is a sender (110) and a second component is a receiver (120). In many embodiments, sender 110 and receiver 120 have transceiver capabilities, they may both send and receive (though not necessarily simultaneously). The components 110 and 120 thus should not be understood as dedicated in their respective roles with bus 170.

The signal lines of bus 170 each have a particular role. In one embodiment, Vbus line 130 provides the voltage of the bus 170, it effectively powers the bus and may power one or more components on the bus (typically drawing power from another component on the bus). Ground line 160 is typically a common or ground line electrically, providing a reference potential for signals on the bus and for components connected to or coupled to the bus. The data lines 140 and 150 may be implemented as a differential pair of data lines to provide signal integrity, or may be implemented as two separate and independent data lines in other embodiments. However, these two data lines do not allow for much if anything such as dedicated control signals.

Figure 2:
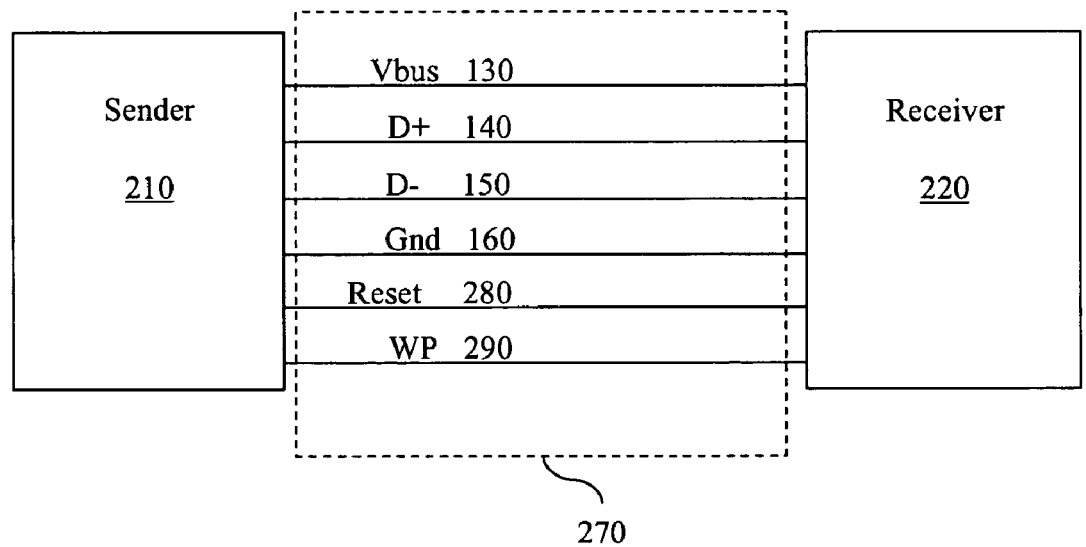
FIG. 2 illustrates an embodiment of a system incorporating a USB bus with extensions.

While an interface may exist at both ends of the bus for control signals (e.g. dedicated pins/leads on packaged chips for example), the connecting bus control line is not present in the USB bus. Thus, an architecture which can handle control lines may be useful. FIG. 2 illustrates an embodiment of a system incorporating a USB bus with extensions. System 200 includes a sender and receiver, and the classic bus components of a USB bus (Vbus, ground, and two data lines), and further includes two additional control signal lines. Sender 210 is a component which is sending data along bus 270 during the snapshot illustrated in FIG. 2. Similarly, receiver 220 is a component which is receiving data from sender 210 along bus 270. Bus 270 includes the standard USB lines, and is extended to include two dedicated lines, reset 280 and write protect 290. Note that other dedicated control lines may be appropriate in other circumstances or designs. By extending the USB bus, to provide an enhanced bus architecture, some of the control features of wider buses are provided, while the simplicity of routing and designing for the USB bus is maintained.

One component which may be used on a USB bus or similar bus architecture is a FLASH memory module. FIG. 3 illustrates an embodiment of a FLASH memory module. A FLASH memory module may typically include an interface, a controller, and FLASH memory. Module 300 includes a connector 330, a serial FLASH controller 320 and FLASH memory 310. As depicted, FLASH memory may be embodied as a single FLASH chip or a set of multiple FLASH chips. Memory 310 is coupled to controller 320, so controller 320 can control access to memory 310. For example, controller 320 may be expected to interpret commands from outside the module, supply addresses to memory 310, read data from and write data to memory 310, and sequence that data for transmission (or as a result of reception).

Controller 320 is also coupled to connector 330. As illustrated, connector 330 is designed to receive six signals, which may be expected to travel along six conductors physically connected to connector 330. These signals are Vbus, D+, D−, Ground, Reset and Write Protect. These signals may be the same signals illustrated in FIG. 2, for example. Of those signals, each of D+, D−, Reset and Write Protect may be passed directly to controller 320. Controller 320 may operate based on the voltage supplied on Vbus, using the ground signal as a common ground. However, Vbus is likely to be regulated by a power regulator or voltage regulator (not shown).

Thus, controller 320 may receive commands and data along data lines D+ and D−, with commands including requests to read, write, and otherwise operate. When it is necessary to reset the entire module, a separate reset signal may be sent along the Reset line. Similarly, when write protection is deemed appropriate, a write protect signal may be sent along the Write Protect line, allowing controller 320 to disable writes to memory 310 (and potentially allowing a similar signal to be asserted to memory 310). Moreover, controller 320 may receive data from memory 310 in parallel form, and serialize that data for transmission along D+ and D− lines, and may similarly convert serial data received along D+ and D− lines to parallel format data for writing to memory 310. The Write Protect line may be expected to be asserted when the surrounding system is experiencing effects which are likely to produce transient voltages, such as during a power-on reset, for example, and the design of the system is to protect the data in memory 310.

The actual electrical signals received by the memory module of FIG. 3 may be expected to act as inputs to a variety of circuits. FIG. 4 illustrates an embodiment of an inbound signal interface. The collective circuitry of FIG. 4 may be interface or input circuitry of a module, and may be found at one (or more) interface circuitry site(s) on an associated printed circuit board. Moreover, some or all of this circuitry may be incorporated into an integrated circuit of a memory module, such as a controller, for example.

As illustrated, Vbus is provided as input to a voltage regulator or power regulator, which may provide a single power supply voltage for the module (e.g. Vcc) or multiple power supply voltages (thus including Vdd for example). Ground is provided as the common ground for the printed circuit board. D+ and D− are both inputs to buffers 430, which may provide termination to the transmission line formed by a signal trace, for example, and may also smooth or amplify the signal of each signal line. Not shown is an alternative embodiment in which D+ and D− are differential inputs to a differential amplifier. Reset and Write Protect are provided as inputs to buffers 430 as well, but are also provided with a pullup resistor 420 coupled to Vcc. Thus, Reset and Write Protect may be expected to be active low signals, with the memory module acting to keep these signals high (and thus non-asserted) during normal operation.

With respect to Reset, a capacitor is also illustrated, as an RC circuit may be used to time a power-on reset signal, and to otherwise limit the rise time of the Reset signal, potentially ensuring and orderly transition out of a reset state. Note that the capacitor (and resistor) may be implemented in a variety of ways, including through use of an on-chip RC circuit in an associated integrated circuit, for example. In an exemplary embodiment, resistors 420 may be expected to be on the order of 1 Megaohm, and generally should be high (highly resistive) relative to the input resistance of an associated buffer 430. However, in other embodiments, resistors 420 may be much lower, such as on the order of 1 kiloohm, for example, and a magnitude of a resistor 420 for the Reset signal may be determined based on preferred timing of an associated RC circuit.

While the memory module of FIG. 3 is depicted with a single connector, multiple connector formats may also be used. FIG. 5A illustrates a top view of an embodiment of a printed circuit board. Printed circuit board 500 may be expected to be a memory module or similar component which uses the USB bus architecture. Board 500 includes two connector population sites 510 and 520. From this top view, it is apparent that these two connector sites are separate, and in some embodiments this would be desirable. In alternate embodiments, an overlapping pair of connector population sites may be desired.

In one embodiment, connector 510 is associated with standard USB, and connector 520 is associated with enhanced or expanded USB (which may be termed USB+, for example). Thus, one of the two connectors 510 and 520 may be populated depending on which type of interface is to be used. Moreover, signals may be routed through traces to both connector sites, such that common signals such as Vbus, Ground, D+ and D− are provided at both sites. Connector 520 may have the further signals Reset and Write Protect also routed thereto.

To illustrate the practical significance of this embodiment, a dedicated configuration may be useful. FIG. 5B illustrates a side view of the printed circuit board of FIG. 5A in a first configuration. Printed circuit board 500 is populated with connector 510, for use with a standard USB architecture. Note that connector 510 may allow for other signals as well, but would not be designed for a specific extended USB architecture. If, on the other hand, connector 520 was populated instead (as shown by dashed lines), then the board 500 would be configured for an extended USB architecture.

As one may expect, other designs may also be used for a multiple configuration board with both USB and extended USB configurations. FIG. 6A illustrates a side view of an alternative embodiment of a printed circuit board. Printed circuit board 600 has population sites for connectors 610 (shown actually populated) and 620 (shown unpopulated). In one embodiment, connector 610 is used for a standard USB architecture and connector 620 is used for an extended USB architecture.

FIG. 6B illustrates a top view of the printed circuit board of FIG. 6A in a first configuration. In the configuration illustrated, connector 610 is populated on the top of board 600, providing the first configuration, in which a standard USB architecture is used. Connector site 620 is shown for reference, but is not actually populated. FIG. 6C illustrates a bottom view of the printed circuit board of FIG. 6A in a second configuration. In the configuration illustrated here, connector 620 is populated, providing the second configuration, in which an extended USB architecture is used. Connector 610 is not populated, and the site for connector 610 is shown for reference.

Figure 7:
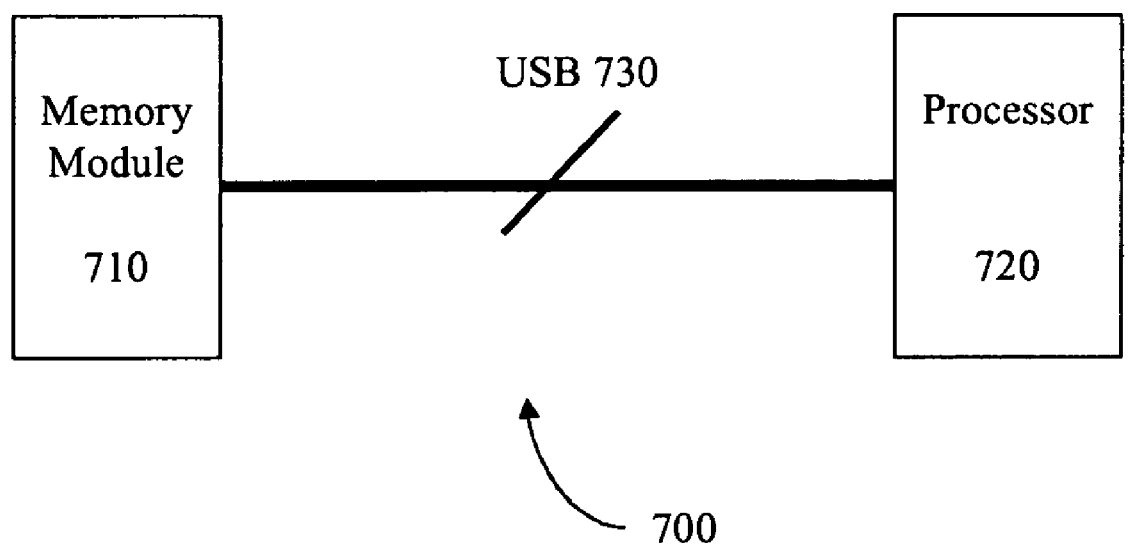
FIG. 7 illustrates another embodiment of a system incorporating a USB bus.

The USB bus architecture has been mentioned as a popular design. FIG. 7 illustrates another embodiment of a system incorporating a USB bus. System 700 includes a memory module, a processor, and a bus between the two components. Memory module 710 may be a FLASH memory module or other similar memory component, typically with some form of addressable memory embodying code which may be executed by processor 720, and data which may be read or manipulated by processor 720. Processor 720 may be one of a variety of components, such as a microprocessor, microcontroller, digital signal processor, or other similar device. Processor 720 may be used to control some or all of a larger system or device, such as a computer, appliance, manufacturing machinery, or other device.

To allow for communication between the two components, memory module 710 is coupled to processor 720 through USB bus 730. Processor 720 typically will have a USB interface included in its pinout or connections off-chip, so the USB bus can effectively be connected to the processor 720 without need for a hub or bridge or similar control interface. Moreover, an enhanced or extended bus may also be made, using signals native to processor 720, such as reset or write protect, in some embodiments. Thus, USB bus 730 may be enhanced while still allowing for direct connection to processor 720.

Figure 8:
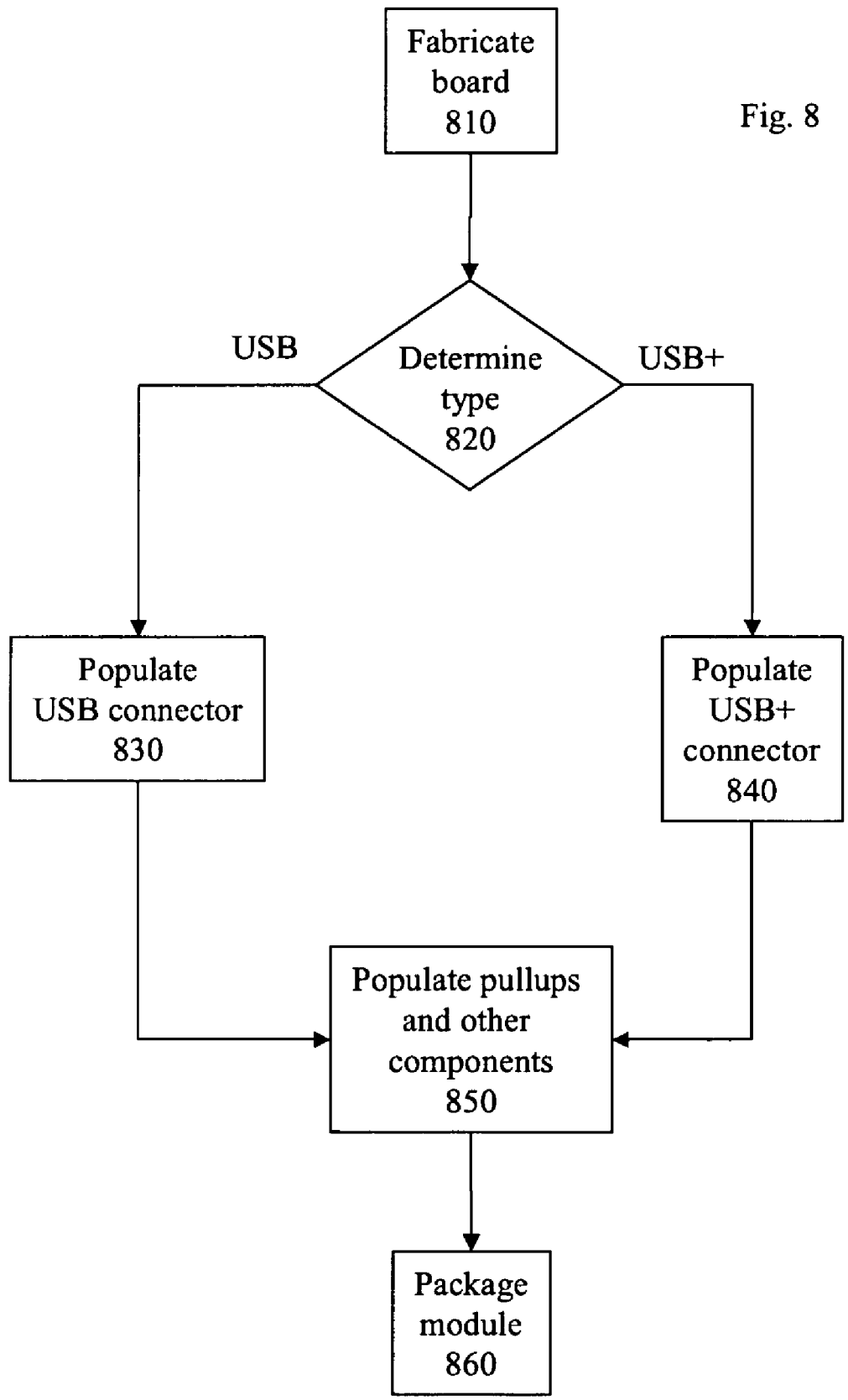
FIG. 8 illustrates an embodiment of a process of making a printed circuit board.

To make the various embodiments described, various processes may be used. FIG. 8 illustrates an embodiment of a process of making a printed circuit board. Process 800 includes fabricating the printed circuit board, determining what type of board is to be made, populating a connector for that type of board, populating other components, and packaging the resulting memory module. Process 800, and all processes described and illustrated herein are composed of a set of modules, which may represent process operations or devices which perform such operations, and may be reorganized in a serial or parallel fashion, and may also be combined or subdivided in various embodiments.

Process 800 begins at module 810, with fabrication of a printed circuit board. At module 820, a determination is made as to whether the final memory module should handle a standard USB architecture or an extended USB architecture. If a standard architecture, then at module 830, a connector site is populated with a connector appropriate for the standard architecture. If the extended architecture is chosen, then at module 840, a connector site is populated with a connector appropriate for the extended architecture in question. At module 850, other components, such as pullup resistors, control circuitry, memory chips and similar devices are populated on the printed circuit board. At module 860, the printed circuit board with components is packaged as a memory module.

Note that the determination of which bus architecture to use may be made in a variety of ways. For example, separate bills of material may be available in a production environment, depending on which architecture is to be used. Selection of the bill of material against which the modules are built may then effectively select the bus architecture. Moreover, note that population of the connector need not be separate from population of other components.

Figure 9:
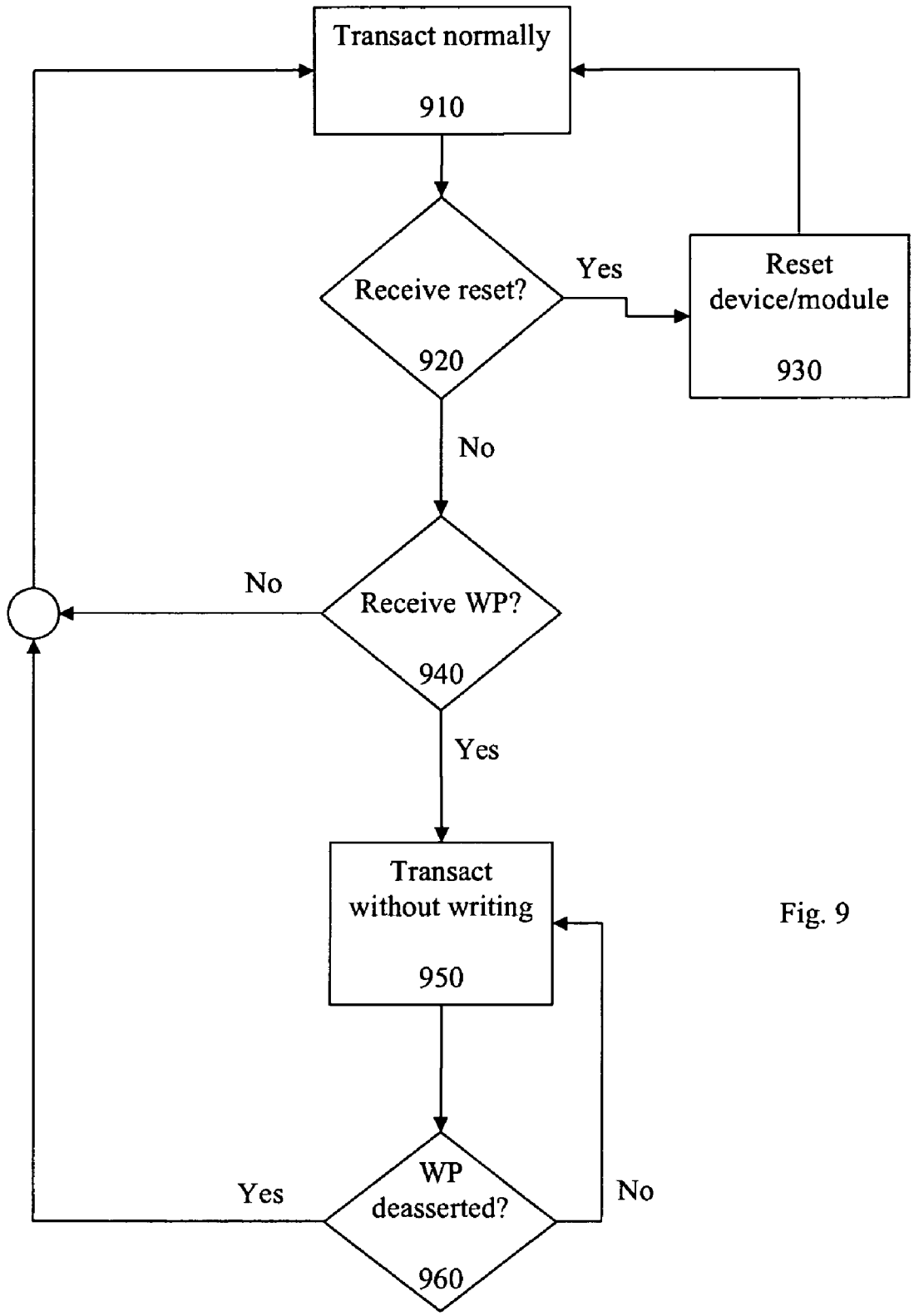
FIG. 9 illustrates an embodiment of a process of operating a FLASH memory module with an extended USB bus.

Once fabricated, a memory module may be used in a variety of ways, but operation of the memory module may be illustrated in a straightforward manner. FIG. 9 illustrates an embodiment of a process of operating a FLASH memory module with an extended USB bus. Process 900 includes transacting memory requests normally (reading and writing), resetting responsive to a reset signal, and declining writes responsive to a write protect signal.

Process 900 normally operates at module 910, wherein memory transactions occur normally, with reads and writes handled. At module 920, a determination is made as to whether a reset signal has arrived. If so, then at module 930 the memory module is reset (such as by a predefined procedure in a controller for example), and the process returns to normal operation at module 910.

If no reset has been received, a determination is made at module 940 as to whether a write protect signal has been received. If so, at module 950 transactions are handled by the memory module without writing data. This may be implemented by declining or failing write requests, or simply ignoring write requests, with the difference being whether the failure to write is signaled back to the requesting device. At module 960, a determination is made as to whether the write protect signal is still being asserted. If so, the process returns to module 950 for write protected operation. If not, and if the write protect signal was never asserted, the process returns to normal operation at module 910.

Similarly, features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. An apparatus, comprising: a printed circuit board having a plurality of traces, the plurality of traces including a first set of traces including four traces, the first set of traces defining a universal serial bus by defining a power trace, a ground trace, a first data signal and a second data signal, the first set of traces being routed between a first connector site and an interface circuitry site; the first set of traces being also routed between a second connector site and the interface circuitry site, the plurality of traces also including a second set of traces including two traces, the second set of traces defining extended signals of the universal serial bus by including traces for a reset signal and a write protect signal, the second set of traces being routed between the second connector site and the interface circuitry site, wherein the first connector site and the second connector site are spaced apart from one another, further comprising a connector connected to the first connector site, the connector including conductors coupled to the first set of traces.

2. The apparatus of claim 1, further comprising:
a connector connected to the first connector site, the connector including conductors coupled to the first set of traces.

3. The apparatus of claim 1, further comprising:
an interface that connects the first connector site to a separate printed circuit board.

4. The apparatus of claim 1, further comprising:
a FLASH memory chip coupled to the printed circuit board, the memory chip coupled to the interface circuitry site through traces of the printed circuit board.

5. The apparatus of claim 4, further comprising:
a FLASH memory controller chip coupled to the printed circuit board at the interface circuitry site, the controller chip incorporating interface circuitry.

6. The apparatus of claim 5, further comprising:
a connector connected to the first connector site, the connector including conductors coupled to the first set of traces.

7. The apparatus of claim 5, further comprising:
a connector connected to the second connector site, the connector including conductors coupled to the first set of traces and the second set of traces.

8. The apparatus of claim 4, further comprising:
a FLASH memory controller chip coupled to the printed circuit board electrically between the memory chip and the interface circuitry site.

9. The apparatus of claim 6, further comprising:
interface circuitry coupled to the printed circuit board at the interface circuitry site, the interface circuitry coupled to the controller chip and to the first connector site and the second connector site.

10. An apparatus, comprising: a printed circuit board having a plurality of traces, the plurality of traces including a first set of traces defining a universal serial bus by defining a power trace, a ground trace, a first data signal and a second data signal, the first set of traces being routed between a connector site and an interface circuitry site, the plurality of traces also including a second set of traces, the second set of traces defining extended signals of the universal serial bus by including traces for a reset signal and a write protect signal, the second set of traces being routed between the connector site and the interface circuitry site, wherein the first connector site and the second connector site are spaced apart from one another, and wherein the first set of traces and the second set of traces are configured to define sets of signal further comprising a FLASH memory chip coupled to the printed circuit board, the memory chip coupled to the interface circuitry site through traces of the printed circuit board.

11. The apparatus of claim 10, further comprising:
a FLASH memory controller chip coupled to the printed circuit board at the interface circuitry site, the controller chip incorporating interface circuitry.

12. The apparatus of claim 11, further comprising:
a connector connected to the connector site, the connector including conductors coupled to the first set of traces and the second set of traces.

13. The apparatus of claim 10, further comprising:
a plurality of FLASH memory chips coupled to the printed circuit board, the plurality of memory chips coupled to the interface circuitry site through traces of the printed circuit board.

14. The apparatus of claim 10, further comprising:
a FLASH memory controller chip coupled to the printed circuit board electrically between the connector site and the plurality of FLASH memory chips.

* * * * *